United States Patent
McVicar

(12)
(10) Patent No.: US 6,724,113 B2
(45) Date of Patent: Apr. 20, 2004

(54) REDUCED BACKLASH ZERO COGGING REVERSING TRANSMISSION

(75) Inventor: David McVicar, El Dorado, CA (US)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 10/187,407

(22) Filed: Jun. 28, 2002

(65) Prior Publication Data

US 2004/0000829 A1 Jan. 1, 2004

(51) Int. Cl.[7] .......................... H02K 16/00; H02K 16/02
(52) U.S. Cl. ..................... 310/114; 310/112; 310/49 R; 310/154.22; 310/154.33; 310/51
(58) Field of Search ............................. 310/80, 83, 112, 310/114, 154.33, 156.35–156.3, 154.22, 49 R, 51

(56) References Cited

U.S. PATENT DOCUMENTS 4,994,702 A * 2/1991 Arita ......................... 310/254
6,559,569 B2 * 5/2003 Aoshima ..................... 310/112

* cited by examiner

Primary Examiner—Burton S. Mullins
Assistant Examiner—J. Aguirrechea
(74) Attorney, Agent, or Firm—Townsend and Townsend and Crew LLP

(57) ABSTRACT

Embodiments of the present invention are directed to gear transmission apparatus that are configured to largely eliminate the cogging effects and to reduce the backlash effects. In one embodiment, a transmission apparatus comprises a follower gear, a first drive gear set coupled with the follower gear to drive the follower gear, and a second drive gear set coupled with the follower gear to drive the follower gear. The first drive gear set includes at least one gear, and the second drive gear set includes at least one gear. A first motor is coupled with the first drive gear set. The first motor includes a first rotor having a plurality of poles which are movably disposed relative to a plurality of magnets. A second motor is coupled with the second drive gear set. The second motor includes a second rotor having a plurality of poles which are movably disposed relative to a plurality of magnets. The disposition of the poles relative to the magnets of the first motor is out of phase with respect to the disposition of the poles relative to the magnets of the second motor. The first motor produces a torque that varies between a first maximum level and a first minimum level, and the second motor produces a torque that varies between a second maximum level and a second minimum level. The torque of the first motor and the torque of the second motor do not reach the first and second maximum levels, respectively, at the same time and do not reach the first and second minimum levels, respectively, at the same time.

25 Claims, 6 Drawing Sheets

REDUCED BACKLASH ZERO COGGING REVERSING TRANSMISSION

BACKGROUND OF THE INVENTION

This invention relates generally to mechanical transmission apparatus and, more particularly, to gear-based transmission apparatus having reduced backlash effects and little or no cogging effects.

Gear based transmission represents a very rigid and cost effective method for transmitting large forces at a very low cost when compared to cable and belt based transmissions. Gear based transmissions, however, must maintain clearance between the mating teeth of the gear sets that make up the gear train. This clearance, called backlash, exists in even the most precise of mechanisms to allow for misalignment, manufacturing variances, and material expansion and contraction due to temperature changes. In devices that are designed to transmit a torque or other forces in rapidly changing environments, such as force feed back mechanisms in simulator input devices, this backlash diminishes the response of the transmission system. For instance, when the input device needs to reverse the transmission of a force, the backlash causes a delay in the system response. This delay is particularly problematic for devices that use gear based transmissions to transmit torque and reverse direction rapidly while maintaining a high frequency response.

As the frequency of the system increases, the forces transmitted by the input device may decrease to such a degree that the time required to fully reverse the transmission exceeds the time needed to remove the clearance between the teeth, thereby resulting in no transmission of force at all. The problem of backlash limits the ability of the device to simulate effectively actual real world behavior, reducing its value in program simulation.

Moreover, the motors used in the apparatus typically have an inherent detent position, which causes a stepping action known as the cogging effect that is caused by the interaction of magnets and poles of the rotor. Due to the cogging effect, the output shaft of the device exhibits an undesirable notched or stepped feeling during use.

BRIEF SUMMARY OF THE INVENTION

Embodiments of the present invention are directed to transmission apparatus that are configured to largely eliminate the cogging effects and to reduce the backlash effects. Controlling the backlash effects and reducing or eliminating cogging effects are particularly advantageous, for instance, for devices that use gear based transmissions to transmit torque and reverse direction rapidly while maintaining high frequency response. In specific embodiments, a dual motor, single reduction transmission is used to eliminate the cogging effects and reduce the backlash effects, and to improve the frequency response of the transmission. The dual motor transmission includes two motors with motor pinions for driving a follower gear, preferably via a single gear reduction. By controlling the motors to rotate out of phase with respect to one another, the cogging effects are reduced or eliminated. The highs and lows of the detent torques of the two motors are smoothed out when combined. As one motor approaches its maximum resistance to rotation and thus its minimum rate of change, the other motor is half of a cycle behind the first motor at its minimum resistance to rotation and thus its maximum rate of change. When the motors continue to rotate, the decrease in resistance of one motor is matched with the increase in resistance of the other motor.

In addition, the use of two motors coupled with a single reduction gear allows the transmission to achieve the same output torque as a single motor, double reduction transmission, by providing twice the motor torque to offset reducing the gear reduction by half. By eliminating the second reduction, however, the total backlash is reduced by more than about 50%. This reduction in backlash results from the reduced complications involved with tolerancing two sets of gears in a double reduction transmission.

In accordance with an aspect of the present invention, a transmission apparatus comprises a follower gear, a first drive gear set coupled with the follower gear to drive the follower gear, and a second drive gear set coupled with the follower gear to drive the follower gear. The first drive gear set includes at least one gear, and the second drive gear set includes at least one gear. A first motor is coupled with the first drive gear set. The first motor includes a first rotor having a plurality of poles which are movably disposed relative to a plurality of magnets. A second motor is coupled with the second drive gear set. The second motor includes a second rotor having a plurality of poles which are movably disposed relative to a plurality of magnets. The disposition of the poles relative to the magnets of the first motor is out of phase with respect to the disposition of the poles relative to the magnets of the second motor.

In some embodiments, only one of the poles is aligned with one of the magnets in an alignment position for the first motor at any time, and only one of the poles is aligned with one of the magnets in an alignment position for the second motor at any time. The alignment position for the first motor and the alignment position for the second motor do not occur simultaneously. The first motor reaches the alignment position periodically over time with a first time period, and the second motor reaches the alignment position periodically over time with a second time period. The alignment position of the first motor falls substantially midway in time between two adjacent alignment positions of the second motor. The first time period and the second time period are equal.

In specific embodiments, the first motor comprises three poles angularly spaced around the first rotor, and the second motor comprises three poles angularly spaced around the second rotor. The first drive gear set consists of a first pinion and the second drive gear set consists of a second pinion.

In accordance with another aspect of the invention, a transmission apparatus comprises a follower gear, a first drive gear set coupled with the follower gear to drive the follower gear, and a second drive gear set coupled with the follower gear to drive the follower gear. The first drive gear set including at least one gear, and the second drive gear set including at least one gear. A first motor is coupled with the first drive gear set. The first motor includes a plurality of poles which are movably disposed relative to a plurality of magnets to produce a torque which varies in time between a first maximum level and a first minimum level. A second motor is coupled with the second drive gear set. The second motor includes a plurality of poles which are movably disposed relative to a plurality of magnets to produce a torque which varies in time between a second maximum level and a second minimum level. The torque of the first motor does not reach the first maximum level at the same time that the torque of the second motor reaches the second maximum level. The torque of the first motor does not reach the first minimum level at the same time that the torque of the second motor reaches the second minimum level.

In some embodiments, the torque of the first motor reaches the first maximum level at about the same time the torque of the second motor reaches the second minimum level. The torque of the first motor reaches the first minimum level at about the same time the torque of the second motor reaches the second maximum level. The first maximum level of the torque of the first motor is substantially the same as the second maximum level of the torque of the second motor. The first minimum level of the torque of the first motor is substantially the same as the second minimum level of the torque of the second motor.

In accordance with another aspect of this invention, a method of reducing or eliminating cogging effects in a transmission device comprises providing a first drive gear set which includes at least one gear, providing a second drive gear set which includes at least one gear, and coupling the first drive gear set and the second drive gear set with a follower gear. A first motor is coupled with the first drive gear set, and a second motor is coupled with the second drive gear set. The first motor includes a first rotor having a plurality of poles movably disposed relative to a plurality of magnets. The second motor includes a second rotor having a plurality of poles movably disposed relative to a plurality of magnets. The first motor and the second motor are positioned to maintain a disposition of the poles relative to the magnets of the first motor to be out of phase with respect to a disposition of the poles relative to the magnets of the second motor.

In accordance with another aspect of the present invention, a method of reducing or eliminating cogging effects in a transmission device comprises providing a first drive gear set which includes at least one gear, providing a second drive gear set which includes at least one gear, and coupling the first drive gear set and the second drive gear set with a follower gear. A first motor is coupled with the first drive gear set, and a second motor is coupled with the second drive gear set. The first motor includes a first rotor having a plurality of poles movably disposed relative to a plurality of magnets. The second motor includes a second rotor having a plurality of poles movably disposed relative to a plurality of magnets. The first rotor of the first motor and the second rotor of the second motor are positioned to be out-of-phase with respect to one another such that the torque of the first motor and the torque of the second motor do not reach the maximum level at the same time and do not reach the minimum level at the same time.

DETAILED DESCRIPTION OF THE INVENTION

Figure 1:
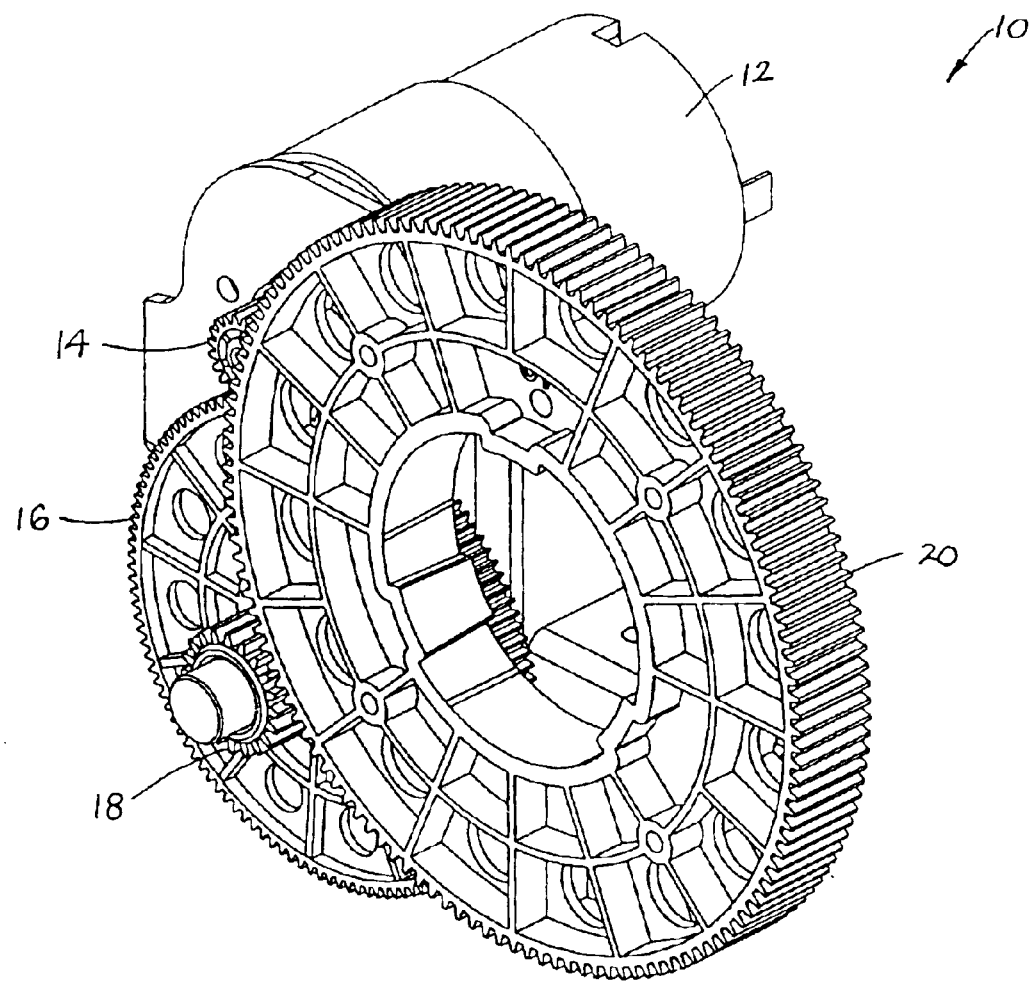
FIG. 1 is a perspective view of a single motor, double reduction transmission apparatus.
Figure 2:
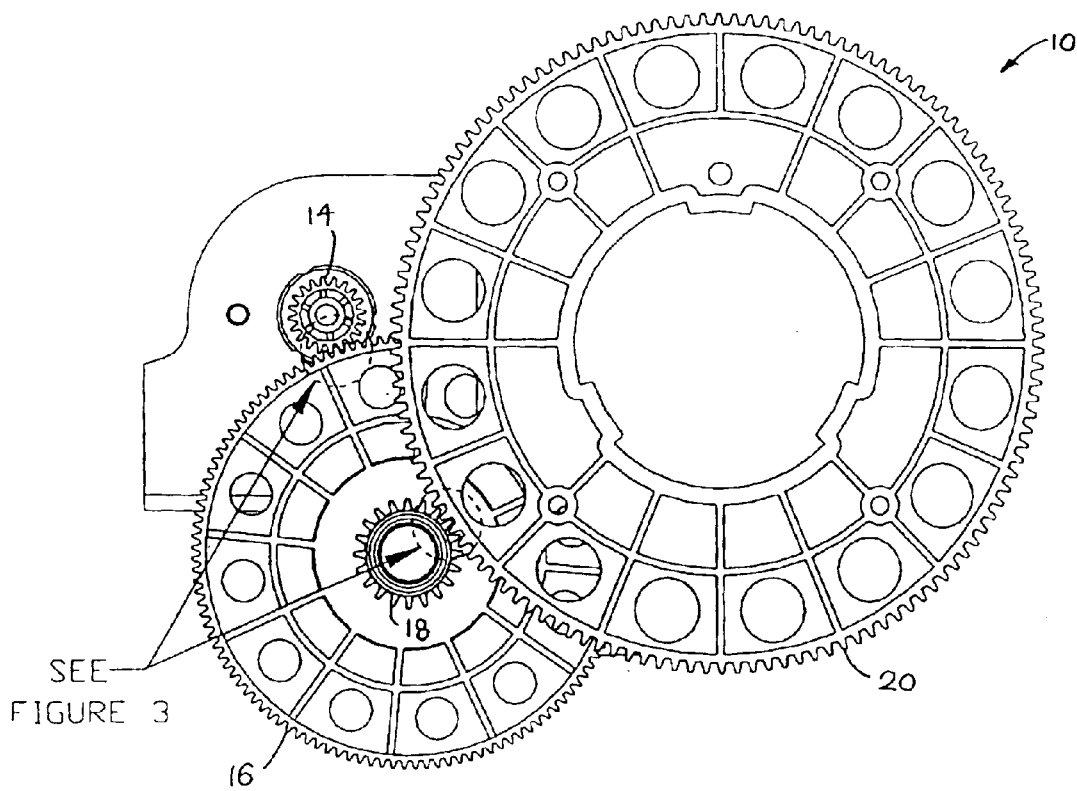
FIG. 2 is an elevational view of the single motor, double reduction transmission apparatus of FIG. 1.

FIGS. 1 and 2 show a single motor, double reduction transmission apparatus 10 having a motor 12 for driving a motor pinion 14, which in turn rotates a drive gear 16 having a drive pinion 18 connected therewith. The drive pinion 18 is coupled with a follower gear 20 to drive it in rotation. The single motor apparatus 10 employs a two-stage transmission which is typically needed to get a sufficiently high reduction ratio, with a cost-effective motor, for interactive gaming devices.

Figure 3:
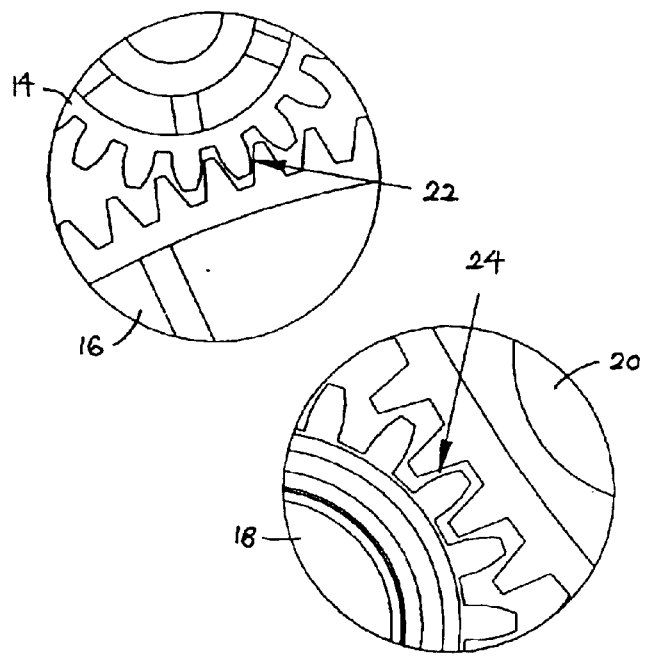
FIG. 3 is a schematic view of the gear teeth in the single motor, double reduction transmission apparatus of FIG. 1 illustrating the backlash.

FIG. 3 illustrates the backlash that exists between the gears in the transmission apparatus 10. The backlash is shown as the clearance 22, 24 between the mating teeth of each pair of the plurality of gears that make up the gear train or system. FIG. 3 shows the clearance 22 between the motor pinion 14 and the drive gear 16 and the clearance 24 between the drive pinion 18 and the follower gear 20. The clearances 22, 24 are provided to allow for misalignment, manufacturing variances, and material expansion and contraction due to temperature changes.

Figure 4:
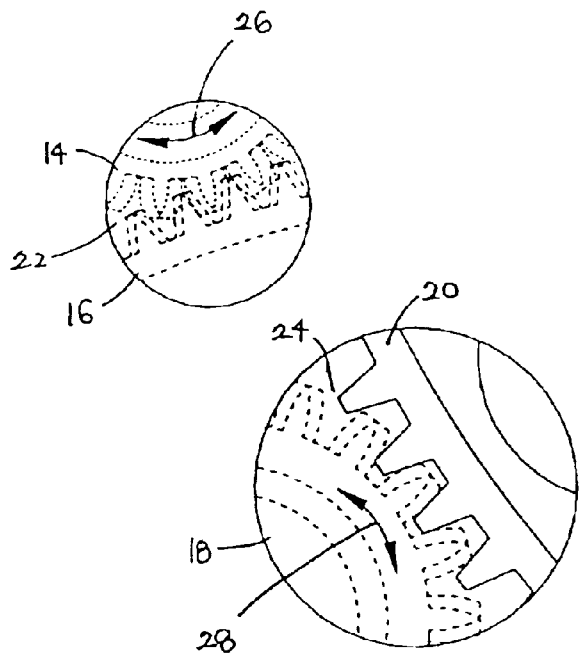
FIG. 4 is a schematic view of the gear teeth in the single motor, double reduction transmission apparatus of FIG. 1 illustrating the backlash effects during transmission reversal.

The clearances 22, 24 inherently decrease the response of the transmission apparatus 10, which is particularly problematic when the apparatus 10 is used to transmit torque and reverse direction rapidly while maintaining a high frequency response. As illustrated in FIG. 4 for the transmission apparatus 10, the backlash 22 in the first reduction between the motor pinion 14 and the drive gear 16 causes a delay in response when the motor pinion 14 reverses direction to engage the drive gear 16 in the opposite direction, as indicated by arrows 26. The drive gear 16 is connected to the drive pinion 18, and experiences additional delay in response due to the backlash 24 in the second reduction between the drive pinion 18 and the follower gear 20. When the drive gear 16 and the drive pinion 18 connected therewith change direction to engage the follower gear 20 in the opposite direction as indicated by arrows 28, the backlash 24 in the second reduction causes the additional delay in response. As the frequency of the apparatus 10 increases, the forces transmitted by the motor 12 may decrease to such a degree that the time required to fully reverse the transmission exceeds the time needed to remove the clearances 22, 24 between the gear teeth, thereby resulting in no transmission at all.

Figure 5:
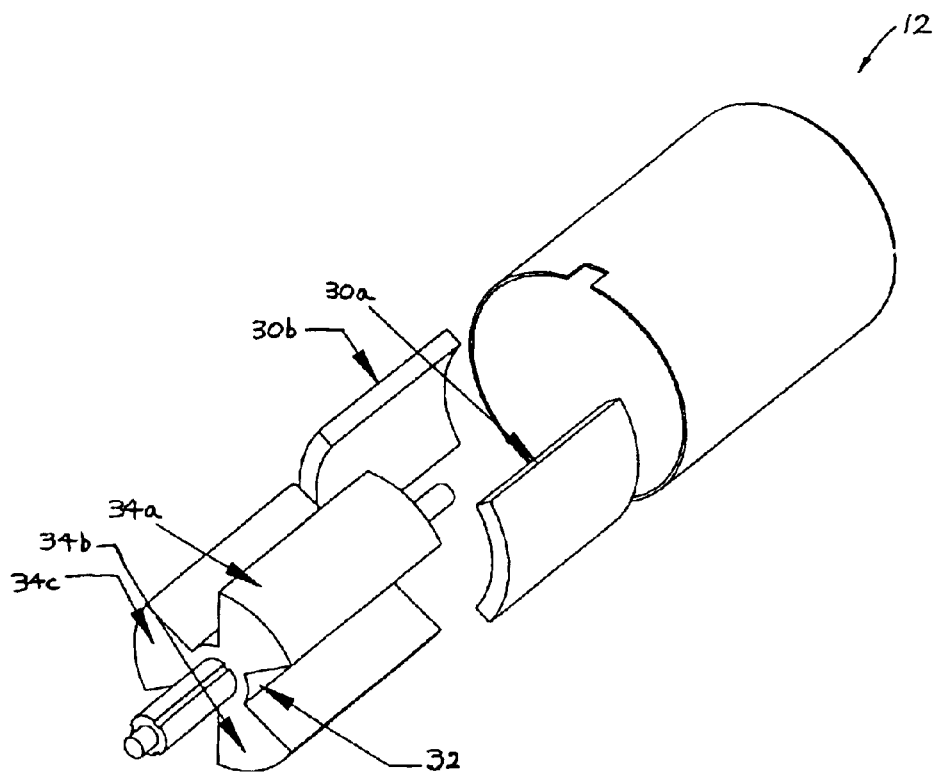
FIG. 5 is a perspective view of a three-pole motor according to an embodiment of the present invention.
Figure 6:
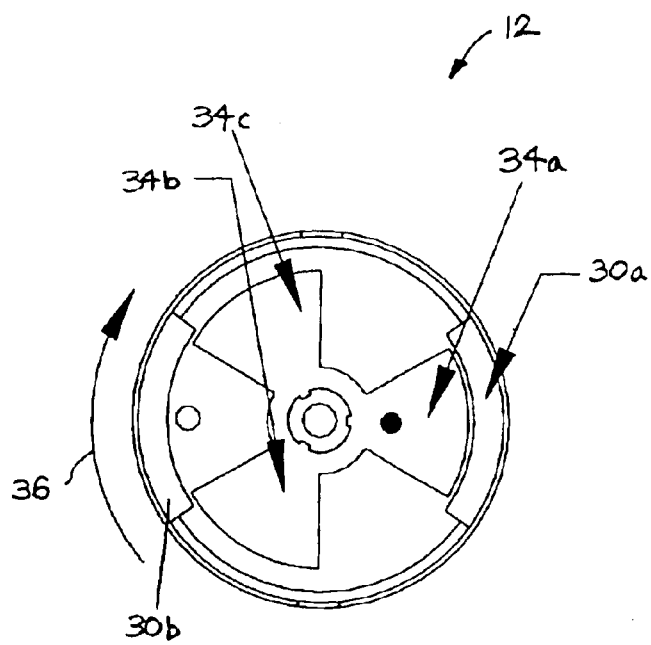
FIGS. 6 and 7 are end views of the three-pole motor of FIG. 5 illustrating the interaction between magnets and poles during rotation of the rotor in the motor.
Figure 7:
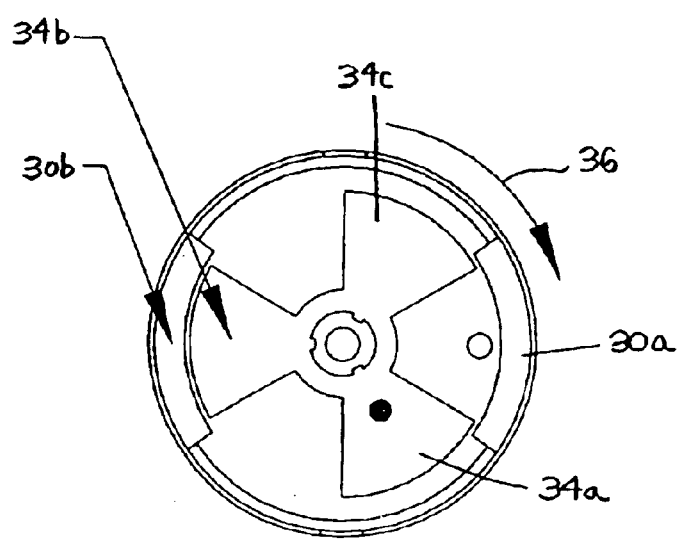

FIG. 5 shows an embodiment of a typical motor 12. The motor 12 has an inherent detent position that causes a stepping action referred to as the cogging effect. As shown in FIG. 5, the motor 12 has two permanent magnets 30a, 30b disposed around a rotor 32 having three poles 34a, 34b, 34c. The magnetic-field generated by the magnets 30a, 30b causes one of the three poles 34a to be aligned with one of the magnets 30a, as shown in FIG. 6. The other two poles 34b, 34c are affected by only part of the magnetic field, since they are almost completely out of alignment with the magnets 30a, 30b. As the motor 12 turns in the direction indicated by the arrow 36, the next alignment of a pole 34b and a magnet 30b occurs after the motor 12 turns by about 60°, as illustrated in FIG. 7. This interaction between the magnets and the poles causes the output shaft of the device incorporating the transmission apparatus 10 to exhibit a notched or stepped feeling known as the cogging effect. To address this issue, expensive, five-poled skewed rotor motors have been used. Those motors also tend to have lower torque specification to further reduce the effects of cogging.

Figure 8:
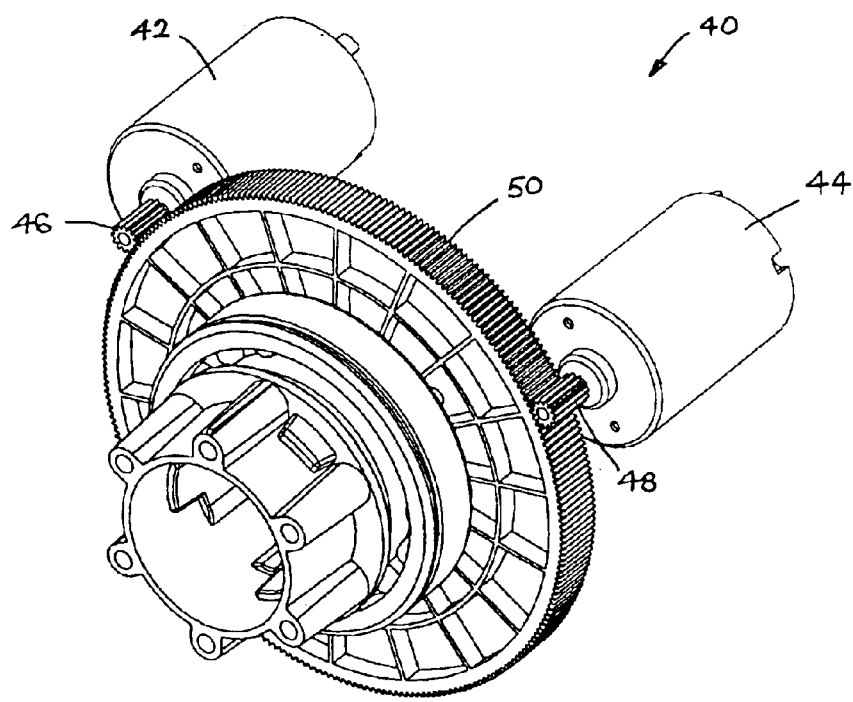
FIG. 8 is a dual motor, single reduction transmission apparatus according to an embodiment of the present invention.
Figure 9:
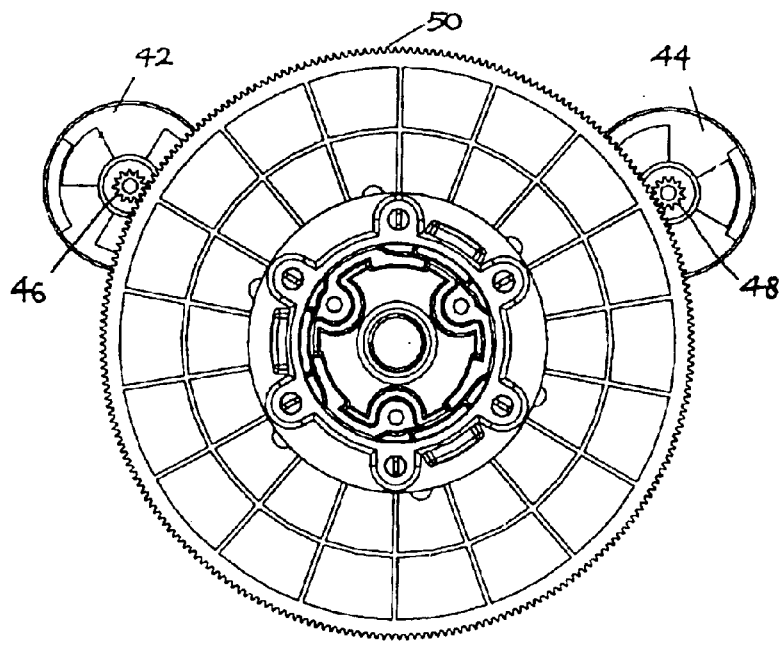
FIG. 9 is an elevational view of the dual motor, single reduction transmission apparatus of FIG. 8 showing out-of-phase rotor position of the dual motor.

FIGS. 8 and 9 show an embodiment of a dual motor transmission apparatus 40 having a single reduction arrangement with the motors 42, 44 arranged such that the poles between the two motors 42, 44 are out of phase with respect to one another to greatly reduce backlash and eliminate the effects of cogging. The first motor 42 drives a first motor pinion 46 and the second motor 44 drives a second motor pinion 48, and the motor pinions 46, 48 in turn rotate a follower gear 50.

Figure 10:
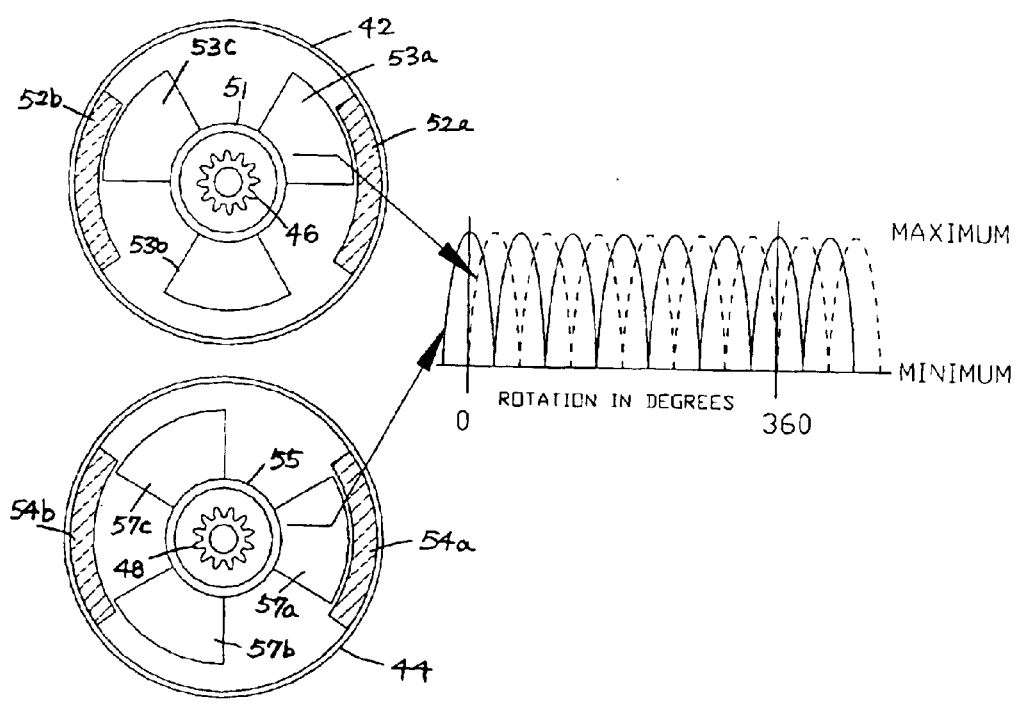
FIG. 10 is an end view of the two motors in the dual motor, single reduction transmission apparatus of FIG. 8 schematically illustrating the decrease in cogging effects.

FIG. 10 shows the two motors 42, 44 having poles that are out of phase with respect to one another. In the specific embodiment shown, the two motors 42, 44 are the same and rotate with the same velocity. The first motor 42 has permanent magnets 52a, 52b, and a first rotor 51 with poles 53a, 53b, 53c. The second motor 44 has permanent magnets 54a, 54b, and a second rotor 55 with poles 57a, 57b, 57c. The magnets each have an angular span of about 70°–80°, while the poles each have an angular span of about 60°. At the particular point in time shown, two of the poles 53a, 53c of the first rotor 51 partially overlap with the two magnets 52a, 52b, respectively, while the third pole 53b does not overlap with either of the magnets 52a, 52b. The two poles 53a, 53c desirably have about the same overlap of about 30°–40° with the two magnets 52a, 52b, respectively. For the second motor 44, one pole 57a is in alignment with one magnet 54a, while the other two poles 57b, 57c overlap only slightly (e.g., about 5°–10°) with the other magnet 54b. The two motors 42, 44 rotate at the same rate, so that they will remain out-of-phase and there is no alignment between a pole and a magnet in both motors 42, 44 at the same time. For instance, when the pole 53a is in alignment with the pole 52a of the first motor 42, the poles 57a, 57b of the second motor 44 will partially overlap the magnets 54a, 54b, respectively, and the pole 57c will not overlap with either of the magnets 54a, 54b. As a result, the disposition of the poles 53a, 53b, 53c relative to the magnets 52a, 52b of the first motor 42 is out of phase with respect to the disposition of the poles 57a, 57b, 57c relative to the magnets 54a, 54b of the second motor 44.

The alignment position between a pole and a magnet for the first motor 42 and the alignment position between a pole and a magnet for the second motor 44 do not occur simultaneously. The first motor 42 reaches the alignment position periodically over time with a first time period, and the second motor reaches the alignment position periodically over time with a second time period. To be fully out of phase, the alignment position of the first motor falls substantially midway in time between two adjacent alignment positions of the second motor, and vice versa. In some cases, the first time period and the second time period are equal.

FIG. 10 shows the detent torque in the two motors 42, 44 as a function of the rotation of the motors 42, 44. The broken curve represents the detent torque of the first motor 42, and the solid curve represents the detent torque of the second motor 44. At zero degree rotation as shown, the first motor 42 has a minimum detent torque because the poles 53a, 53c have the same partial overlap with the two magnets 52a, 52b, respectively, and the pole 53b has no overlap with the magnets 52a, 52b. The second motor 44 has a maximum detent torque because the pole 57a is in alignment with the magnet 54a, and the other two poles 57b, 57c are affected by only a small part of the magnet field due to the slight overlap with the other magnet 54b. In such a configuration, the two motors 42, 44 are fully out-of-phase in that the maximum detent torque for one motor is simultaneous with or overlaps with the minimum detent torque for the other motor. The highs and lows of the detent torques are smoothed out when the two curves from the two motors 42, 44 are combined. As one motor approaches its maximum resistance to rotation and thus its minimum rate of change, the other motor is half of a cycle behind the first motor at its minimum resistance to rotation and thus its maximum rate of change. When the motors 42, 44 continue to rotate, the decrease in resistance of one motor is matched with the increase in resistance of the other motor. In the fully out-of-phase configuration, the overlap occurs near the top of each of the step and during the greatest rate of change of the force, so that the step of one motor is smoothed out by the step of the other motor. In this way, the sum of the detent torques of the two motors 42, 44 produces a generally uniform combined detent torque, and the cogging effect can be largely eliminated.

If the two motors 42, 44 are not fully out of phase but partially out of phase, the cogging effects can still be reduced but may not be completely eliminated. When the two motors 42, 44 are partially or fully out of phase with respect of one another, the torque of the first motor 42 does not reach the first maximum level at the same time that the torque of the second motor 44 reaches the second maximum level, and the torque of the first motor 42 does not reach the first minimum level at the same time that the torque of the second motor 44 reaches the second minimum level. To be fully out of phase, the torque of the first motor 42 reaches the first maximum level at about the same time the torque of the second motor 44 reaches the second minimum level, and the torque of the first motor 42 reaches the first minimum level at about the same time the torque of the second motor 44 reaches the second maximum level. As shown in FIG. 10, the torque of the first motor 42 varies between the first maximum level and the first minimum level periodically over time with a first time period, and the torque of the second motor 44 varies between the second maximum level and the second minimum level periodically over time with a second time period. To be fully out of phase in the embodiment shown, the torque of the first motor 42 reaches the first maximum level substantially midway in time between two adjacent second maximum levels for the torque of the second motor 44, and vice versa. In the embodiment shown, the first maximum level equals the second maximum and the first minimum level equals the second minimum level. In some cases, the first time period and the second time period are equal.

The use of two motors 42, 44 coupled with a single reduction gear 50 in FIGS. 8–10 allows the transmission 40 to achieve the same output torque as a single motor, double reduction transmission (see, e.g., FIGS. 5 and 6), by providing twice the motor torque to offset reducing the gear reduction by half. By eliminating the second reduction, the total backlash is reduced by more than about 50%. This reduction in backlash results from the reduced complications involved with tolerancing two sets of gears in a double reduction transmission.

In addition, by reducing the gear ratio by half, the angular velocities of the motors 42, 44 and pinions 46, 48 are also cut in half. This results in a greatly reduced pitch line velocity and thus a reduction in the noise generated at the tooth interface between the pinion 46 and gear 50 and at the tooth interface between the pinion 48 and gear 50.

As the angular velocities of the motors 42, 44 are reduced by half, the inertia effects of the motors 42, 44 are decreased by much more than 50%. This is due to the fact that the rotational kinetic energy of a body is a squared function of its angular velocity. The required tooth strength of a gear is a function of the forces generated by the inertia of the motor's rotor (which is generated when the assembly hits its mechanical stops at the maximum transmission revolutions per minute). Because the inertia effects are decreased by much more than 50%, the required tooth strength is also reduced by much more than 50%. Therefore, the lower angular velocity allows the use of smaller teeth, and thus larger reduction in a smaller space. That is, the limiting feature of a gear set is the pitch diameter of the smallest gear, which is one of the motor pinions 46, 48 attached to the motors 42, 44. Furthermore, the lower inertia allows for a smoother operation due to the reduction in resistance to rotation caused by the inertia of the motor.

The out-of-phase scheme to reduce the cogging effect allows the use of relatively simpler, cheaper, and higher torque three-pole motors 42, 44. This reduction in the cost of the individual motors, coupled with the elimination of the second gear reduction, provides a much improved force feedback experience at the same cost or less with a higher reliability.

The above-described arrangements of apparatus and methods are merely illustrative of applications of the principles of this invention and many other embodiments and modifications may be made without departing from the spirit and scope of the invention as defined in the claims. For instance, gear sets other than those shown may be used. Alternative gear sets may have different numbers of gears, different gear sizes, different gear arrangements, and the like. The motors may be different and may rotate at different rates, as long as they are properly controlled to be out of phase with respect to one another. More than two motors may be used. The scope of the invention should, therefore, be determined not with reference to the above description, but instead should be determined with reference to the appended claims along with their full scope of equivalents.

What is claimed is:

1. A transmission apparatus comprising:
    a follower gear;
    a first drive gear set coupled with the follower gear to drive the follower gear, the first drive gear set including at least one gear;
    a second drive gear set coupled with the follower gear to drive the follower gear, the second drive gear set including at least one gear;
    a first motor coupled with the first drive gear set, the first motor including a first rotor having a plurality of poles which are movably disposed relative to a plurality of magnets;
    a second motor coupled with the second drive gear set, the second motor including a second rotor having a plurality of poles which are movably disposed relative to a plurality of magnets;
    wherein a disposition of the poles relative to the magnets of the first motor is out of phase with respect to a disposition of the poles relative to the magnets of the second motor; and
    wherein only one of the poles is aligned with one of the magnets in an alignment position for the first motor at any time, wherein only one of the poles is aligned with one of the magnets in an alignment position for the second motor at any time.

2. The transmission apparatus of claim 1 wherein the alignment position for the first motor and the alignment position for the second motor do not occur simultaneously.

3. The transmission apparatus of claim 2 wherein the first motor reaches the alignment position periodically over time with a first time period, wherein the second motor reaches the alignment position periodically over time with a second time period, and wherein the alignment position of the first motor falls substantially midway in time between two adjacent alignment positions of the second motor.

4. The transmission apparatus of claim 3 wherein the first time period and the second time period are equal.

5. The transmission apparatus of claim 3 wherein the first motor comprises three poles angularly spaced around the first rotor, and wherein the second motor comprises three poles angularly spaced around the second rotor.

6. The transmission apparatus of claim 1 wherein the first drive gear set consists of a first pinion and the second drive gear set consists of a second pinion.

7. The transmission apparatus of claim 1 wherein the poles of the first motor are movably disposed relative to the magnets to produce a torque which varies in time between a first maximum level and a first minimum level, wherein the poles of the second motor are movably disposed relative to the magnets to produce a torque which varies in time between a second maximum level and a second minimum level, and wherein the torque of the first motor does not reach the first maximum level at the same time that the torque of the second motor reaches the second maximum level, and wherein the torque of the first motor does not reach the first minimum level at the same time that the torque of the second motor reaches the second minimum level.

8. The transmission apparatus of claim 7 wherein the torque of the first motor reaches the first maximum level at about the same time the torque of the second motor reaches the second minimum level.

9. The transmission apparatus of claim 7 wherein the torque of the first motor reaches the first minimum level at about the same time the torque of the second motor reaches the second maximum level.

10. The transmission apparatus of claim 7 wherein the first maximum level of the torque of the first motor is substantially the same as the second maximum level of the torque of the second motor, and wherein the first minimum level of the torque of the first motor is substantially the same as the second minimum level of the torque of the second motor.

11. A method of reducing or eliminating cogging effects in a transmission device, the method comprising:
    providing a first drive gear set which includes at least one gear;
    providing a second drive gear set which includes at least one gear;
    coupling the first drive gear set and the second drive gear set with a follower gear;
    coupling a first motor with the first drive gear set, the first motor including a first rotor having a plurality of poles movably disposed relative to a plurality of magnets;
    coupling a second motor with the second drive gear set, the second motor including a second rotor having a plurality of poles movably disposed relative to a plurality of magnets;
    positioning the first motor and the second motor to maintain a disposition of the poles relative to the magnets of the first motor to be out of phase with respect to a disposition of the poles relative to the magnets of the second motor;
    wherein only one of the poles is aligned with one of the magnets in an alignment position for the first motor at any time, wherein only one of the poles is aligned with one of the magnets in an alignment position for the second motor at any time.

12. The method of claim 11 wherein the alignment position for the first motor and the alignment position for the second motor do not occur simultaneously.

13. The method of claim 12 the first motor reaches the alignment position periodically over time with a first time period, wherein the second motor reaches the alignment position periodically over time with a second time period, and wherein the alignment position of the first motor falls substantially midway in time between two adjacent alignment positions of the second motor.

14. The method of claim 13 wherein the first time period and the second time period are equal.

15. The method of claim 11 wherein the first motor and the second motor are positioned such that a torque of the first motor and a torque of the second motor do not reach the maximum level at the same time and do not reach the minimum level at the same time.

16. The method of claim 15 wherein the torque of the first motor reaches the maximum level at about the same time the torque of the second motor reaches the minimum level.

17. The method of claim 11 wherein the torque of the first motor reaches the first minimum level at about the same time the torque of the second motor reaches the second maximum level.

18. The method of claim 11 wherein the first motor comprises three poles angularly spaced around a first rotor, and wherein the second motor comprises three poles angularly spaced around a second rotor.

19. The method of claim 11 wherein the first drive gear set consists of a first pinion and the second drive gear set consists of a second pinion.

20. The method of claim 11 wherein the first maximum level of the torque of the first motor is substantially the same as the second maximum level of the torque of the second motor, and wherein the first minimum level of the torque of the first motor is substantially the same as the second minimum level of the torque of the second motor.

21. A transmission apparatus comprising:
 a follower gear;
 a first drive gear set coupled with the follower gear to drive the follower gear, the first drive gear set including at least one gear;
 a second drive gear set coupled with the follower gear to drive the follower gear, the second drive gear set including at least one gear;
 a first motor coupled with the first drive gear set, the first motor including a first rotor having a plurality of poles which are movably disposed relative to a plurality of magnets;
 a second motor coupled with the second drive gear set, the second motor including a second rotor having a plurality of poles which are movably disposed relative to a plurality of magnets;
 wherein a disposition of the poles relative to the magnets of the first motor is out of phase with respect to a disposition of the poles relative to the magnets of the second motor;
 wherein the alignment position for the first motor and the alignment position for the second motor do not occur simultaneously; and
 wherein the first motor reaches the alignment position periodically over time with a first time period, wherein the second motor reaches the alignment position periodically over time with a second time period, and wherein the alignment position of the first motor falls substantially midway in time between two adjacent alignment positions of the second motor.

22. The transmission apparatus of claim 21 wherein the first time period and the second time period are equal.

23. The transmission apparatus of claim 21 wherein the first motor comprises three poles angularly spaced around the first rotor, and wherein the second motor comprises three poles angularly spaced around the second rotor.

24. A method of reducing or eliminating cogging effects in a transmission device, the method comprising:
 providing a first drive gear set which includes at least one gear;
 providing a second drive gear set which includes at least one gear;
 coupling the first drive gear set and the second drive gear set with a follower gear;
 coupling a first motor with the first drive gear set, the first motor including a first rotor having a plurality of poles movably disposed relative to a plurality of magnets;
 coupling a second motor with the second drive gear set, the second motor including a second rotor having a plurality of poles movably disposed relative to a plurality of magnets;
 positioning the first motor and the second motor to maintain a disposition of the poles relative to the magnets of the first motor to be out of phase with respect to a disposition of the poles relative to the magnets of the second motor;
 wherein the alignment position for the first motor and the alignment position for the second motor do not occur simultaneously; and
 wherein the first motor reaches the alignment position periodically over time with a first time period, wherein the second motor reaches the alignment position periodically over time with a second time period, and wherein the alignment position of the first motor falls substantially midway in time between two adjacent alignment positions of the second motor.

25. The method of claim 24 wherein the first time period and the second time period are equal.

* * * * *